(12) United States Patent
Slattery

(10) Patent No.: US 6,286,849 B1
(45) Date of Patent: Sep. 11, 2001

(54) DEPLOYABLE TRAINING WHEELS FOR A BICYCLE

(76) Inventor: James Slattery, 112 E. Hampton Rd., Lindenhurst, NY (US) 11757

( * ) Notice: Subject to any disclaimer, the term of this patent is extended or adjusted under 35 U.S.C. 154(b) by 0 days.

(21) Appl. No.: 09/663,166

(22) Filed: Sep. 15, 2000

(51) Int. Cl.$^7$ ................................................. B62H 1/12
(52) U.S. Cl. ............................................. 280/301; 280/293
(58) Field of Search ..................................... 280/293, 301, 280/302, 303, 298, 299, 300, 43, 47, 43.13, 297

(56) References Cited

U.S. PATENT DOCUMENTS

| | | |
|---|---|---|
| D. 284,879 | 7/1986 | Sengstacken . |
| 518,698 * | 4/1894 | Pipes et al. . |
| 708,809 | 9/1902 | Hayes . |
| 1,154,089 | 9/1915 | Bryant . |
| 1,251,684 | 1/1918 | Murray . |
| 1,369,116 | 2/1921 | Krahn . |
| 4,367,883 * | 1/1983 | Anderson .............................. 280/301 |
| 5,474,319 | 12/1995 | Shepherd . |
| 6,170,846 * | 1/2001 | Holter .................................. 280/293 |

* cited by examiner

Primary Examiner—Annie Marie Boehler

(57) ABSTRACT

A deployable training wheels for a bicycle for safely making the transition between riding with and without training wheels. The deployable training wheels for a bicycle includes a pair of hubs being securely mounted about a rear axle of a bicycle; and also includes a pair of elongate support members each having a first end and a second end which is pivotally mounted to a respective rear axle of the bicycle; and further includes a pair of wheels being mounted to the second ends of the elongate support members; and also includes a releasing and locking assembly for releasing and locking the elongate support members relative to the hubs.

11 Claims, 3 Drawing Sheets

DEPLOYABLE TRAINING WHEELS FOR A BICYCLE

BACKGROUND OF THE INVENTION

1. Field of the Invention

The present invention relates to a training wheel landing gear for a bicycle and more particularly pertains to a new deployable training wheels for a bicycle for safely making the transition between riding with and without training wheels.

2. Description of the Prior Art

The use of a training wheel landing gear for a bicycle is known in the prior art. More specifically, a training wheel landing gear for a bicycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,474,319; U.S. Pat. No. Des. 284,879; U.S. Pat. Nos. 1,251,684; 1,154,089; 1,369,116; and 708,809.

While these devices fulfill their respective, particular objectives and requirements, the aforementioned patents do not disclose a new deployable training wheels for a bicycle. The inventive device includes a pair of hubs being securely mounted about a rear axle of a bicycle; and also includes a pair of elongate support members each having a first end and a second end which is pivotally mounted to a respective rear axle of the bicycle; and further includes a pair of wheels being mounted to the second ends of the elongate support members; and also includes a releasing and locking assembly for releasing and locking the elongate support members relative to the hubs.

In these respects, the deployable training wheels for a bicycle according to the present invention substantially departs from the conventional concepts and designs of the prior art, and in so doing provides an apparatus primarily developed for the purpose of safely making the transition between riding with and without training wheels.

SUMMARY OF THE INVENTION

In view of the foregoing disadvantages inherent in the known types of training wheel landing gear for a bicycle now present in the prior art, the present invention provides a new deployable training wheels for a bicycle construction wherein the same can be utilized for safely making the transition between riding with and without training wheels.

The general purpose of the present invention, which will be described subsequently in greater detail, is to provide a new deployable training wheels for a bicycle which has many of the advantages of the training wheel landing gear for a bicycle mentioned heretofore and many novel features that result in a new deployable training wheels for a bicycle which is not anticipated, rendered obvious, suggested, or even implied by any of the prior art training wheel landing gear for a bicycle, either alone or in any combination thereof.

To attain this, the present invention generally comprises a pair of hubs being securely mounted about a rear axle of a bicycle; and also includes a pair of elongate support members each having a first end and a second end which is pivotally mounted to a respective rear axle of the bicycle; and further includes a pair of wheels being mounted to the second ends of the elongate support members; and also includes a releasing and locking assembly for releasing and locking the elongate support members relative to the hubs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new deployable training wheels for a bicycle which has many of the advantages of the training wheel landing gear for a bicycle mentioned heretofore and many novel features that result in a new deployable training wheels for a bicycle which is not anticipated, rendered obvious, suggested, or even implied by any of the prior art training wheel landing gear for a bicycle, either alone or in any combination thereof.

It is another object of the present invention to provide a new deployable training wheels for a bicycle which may be easily and efficiently manufactured and marketed.

It is a further object of the present invention to provide a new deployable training wheels for a bicycle which is of a durable and reliable construction.

An even further object of the present invention is to provide a new deployable training wheels for a bicycle which is susceptible of a low cost of manufacture with regard to both materials and labor, and which accordingly is then susceptible of low prices of sale to the consuming public, thereby making such deployable training wheels for a bicycle economically available to the buying public.

Still yet another object of the present invention is to provide a new deployable training wheels for a bicycle which provides in the apparatuses and methods of the prior art some of the advantages thereof, while simultaneously overcoming some of the disadvantages normally associated therewith.

Still another object of the present invention is to provide a new deployable training wheels for a bicycle for safely making the transition between riding with and without training wheels.

Yet another object of the present invention is to provide a new deployable training wheels for a bicycle which includes a pair of hubs being securely mounted about a rear axle of a bicycle; and also includes a pair of elongate support members each having a first end and a second end which is pivotally mounted to a respective rear axle of the bicycle; and further includes a pair of wheels being mounted to the second ends of the elongate support members; and also includes a releasing and locking assembly for releasing and locking the elongate support members relative to the hubs.

Still yet another object of the present invention is to provide a new deployable training wheels for a bicycle that prevents the user from falling down upon slowing down with one's bicycle.

Even still another object of the present invention is to provide a new deployable training wheels for a bicycle that allows the user to start oneself upon the bicycle without the aid of another person.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
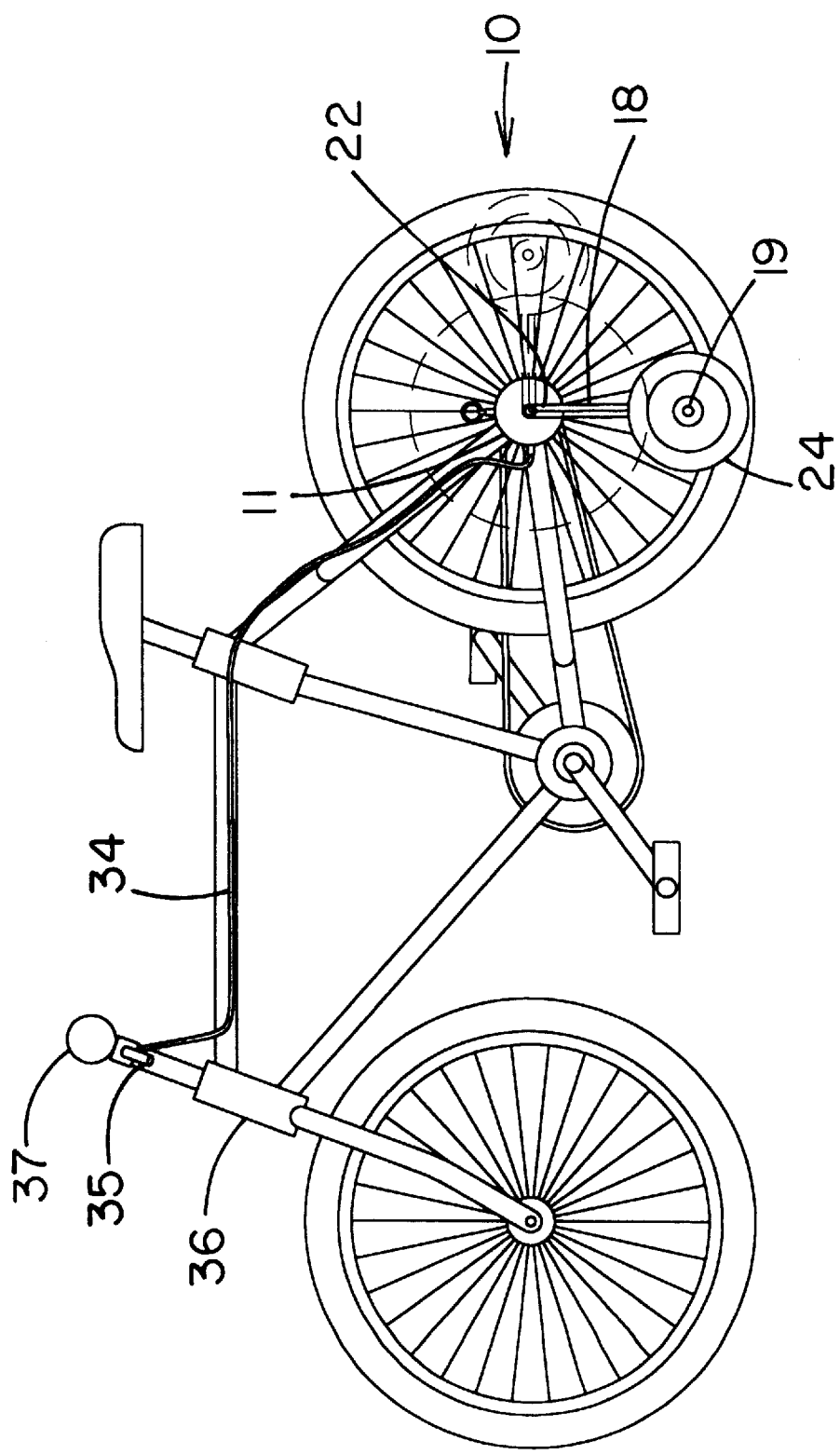
FIG. 1 is a side elevational view of a new deployable training wheels for a bicycle according to the present invention and shown in use.
Figure 2:
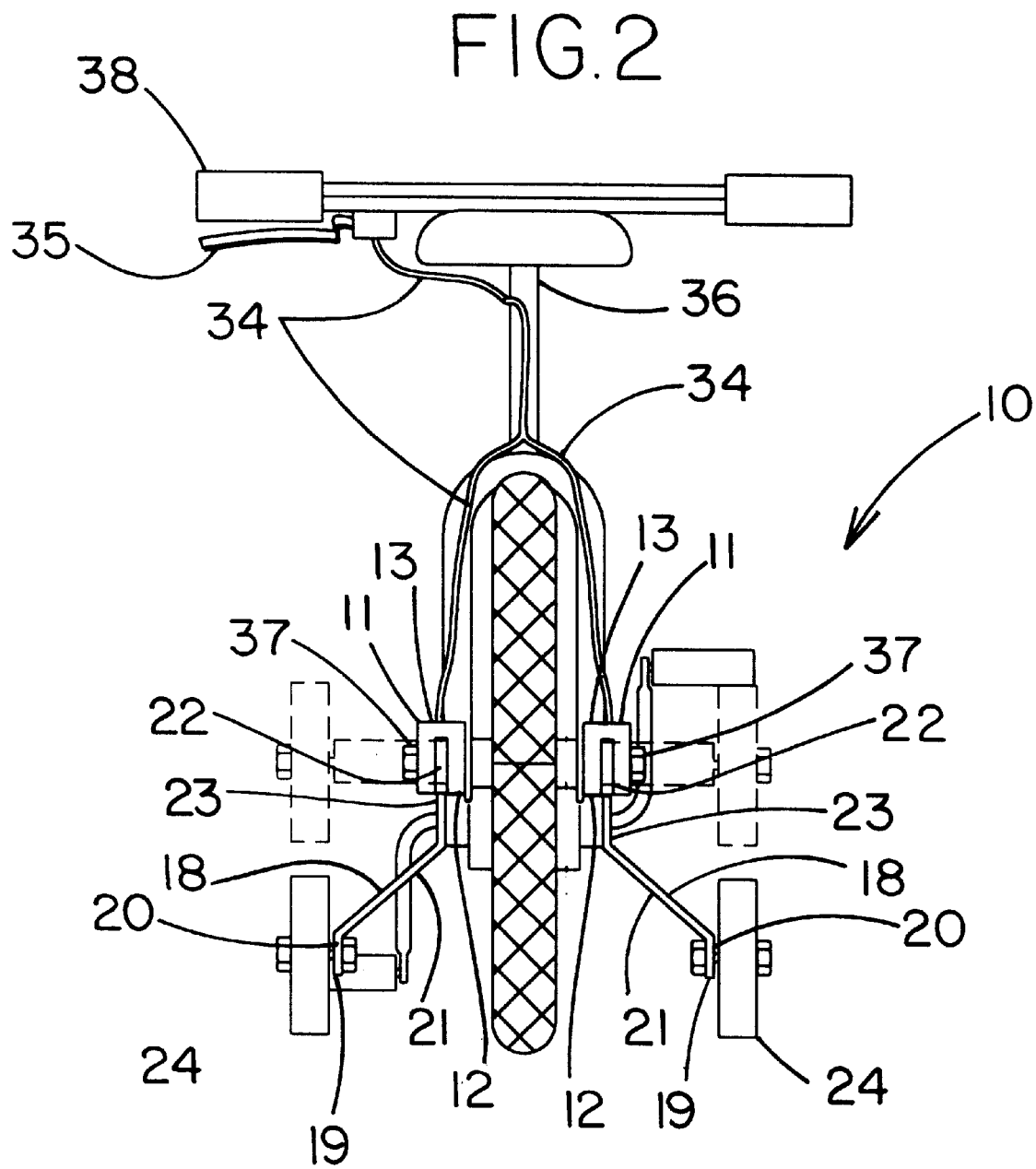
FIG. 2 is a rear elevational view of the present invention.
Figure 3:
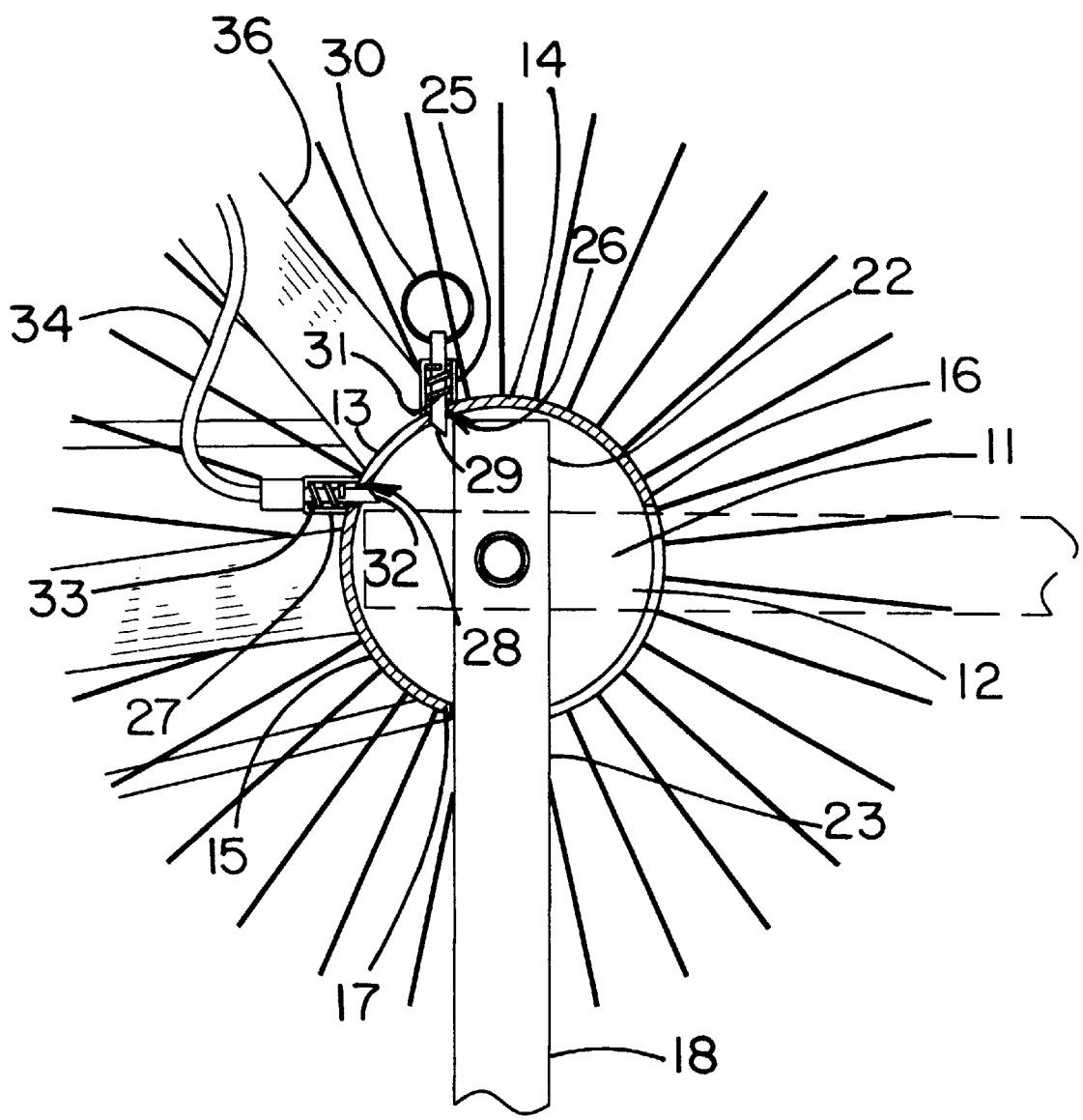
FIG. 3 is a detailed side elevational view of one of the housings of the present invention.

With reference now to the drawings, and in particular to FIGS. 1 through 3 thereof, a new deployable training wheels for a bicycle embodying the principles and concepts of the present invention and generally designated by the reference numeral 10 will be described.

As best illustrated in FIGS. 1 through 3, the deployable training wheels for a bicycle 10 generally comprises a pair of hubs 11 being securely mounted about a rear axle 37 of a bicycle 36. Each of the hubs 11 includes a main portion 12 being adapted to securely mount upon a respective end of the rear axle 37 of the bicycle 36, and also includes a curved flange portion 13 extending outwardly from the main portion 12 and having a top side 14 and a front side 15, and further includes a first tubular stem 25 extending through the top side 14 of the curved flange portion 13 and having a bore 26 extending therethrough, and also includes a second tubular stem 27 extending through the front side 15 of the curved flanged portion 13 and having a bore 28 extending therethrough. Each of the curved flange portions 13 has a back end 16 and a bottom end 17.

The deployable training wheels for a bicycle 10 also comprises a pair of elongate support members 18 each having a first end 19 and a second end 22 which is pivotally and conventionally mounted to a respective end of the rear axle 37 of the bicycle 36. Each of the elongate support members 18 includes a second end portion 23 which pivots between and is engagable to the back end 16 and the bottom end 17 of a respective curved flange portion 13. Each of the elongate support members 18 has an intermediate portion 21 which is angled relative to the second end portion 23 and also having a first end portion 19 which is angled relative to the intermediate portion 21 and which is generally parallel to the second end portion 23. A pair of wheels 24 are mounted to the first ends 19 of the elongate support members 18.

A releasing and locking assembly for releasing and locking the elongate support members 18 relative to the hubs 11 includes a pair of first locking pins 29 movably and biasedly disposed in the first tubular stems 25 and through the top sides 14 of the curved flange portions 13 and being engagable to the second ends 22 of the elongate support members 18 for locking the elongate support members 18 in ground engagement positions. Each of the first locking pins 29 has a ring member 30 attached thereto for allowing a user to manually retract the first locking pin 29 so that a respective elongate support member 18 can be pivoted out of the ground engagement position. The releasing and locking assembly also includes first spring members 31 being securely disposed in the first tubular stems 25 and about the first locking pins 29 for retaining the first locking pins 29 in the first tubular stems 25 and for biasing the first locking pins 29 through the top sides 14 of the curved flange portions 13 of the hubs 11. The releasing and locking assembly further includes a pair of second locking pins 32 movably and biasedly disposed in the second tubular stems 27 and through the front sides 15 of the curved flange portions 13 and being engagable to the second ends 22 of the elongate support members 18 for locking the elongate support members 18 in non-ground engagement positions. The releasing and locking assembly also includes second spring members 33 being securely disposed in the second tubular stems 27 and about the second locking pins 32 for retaining the second locking pins 32 in the second tubular stems 27 and for biasing the second locking pins 32 through the front sides 15 of the curved flange portions 13 of the hubs 11. The releasing and locking assembly further includes cables 34 being connected to the second locking pins 32 for retracting the second locking pins 32 from engagement with the elongate support members 18 to allow the wheels 24 to be pivotally deployed in the ground engagement positions. The releasing and locking assembly also includes a lever 35 being adapted to be conventionally mounted to handle bars 38 of the bicycle 36 and being conventionally attached to the cables 34 for releasing the second pins 32 from engagement with the elongate support members 18.

In use, the user squeezes the lever 35 toward the handle bars 38 of the bicycle 36 to release the elongate support members 18 from the non-ground engagement positions and to deploy the elongate support members 18 in ground engagement positions with the first locking pins 29 locking the elongate support members 18 in the ground engagement positions. To retract the elongate support members 18 to non-ground engagement positions, the user manually retracts the first locking pins 29 and pivots the elongate support members 18 until the second locking pins 32 engages the elongate support members 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A deployable training wheels for a bicycle comprising:
   a pair of hubs being for securely mounting about a rear axle of a bicycle;
   a pair of elongate support members each having a first end and a second end for pivotally mounting to a respective end of the rear axle of the bicycle;
   a pair of wheels being mounted to said first ends of said elongate support members;
   a releasing and locking assembly for releasing and locking said elongate support members relative to said hubs; and
   wherein each of said hubs includes a main portion being adapted for securely mounting upon a respective end of the rear axle of the bicycle, and also includes a curved flange portion extending outwardly from said main portion and having a top side and a front side, and further includes a first tubular stem extending through said top side of said curved flange portion and having a bore extending therethrough, and also includes a second tubular stem extending through said front side of said curved flanged portion and having a bore extending therethrough.

2. A deployable training wheels for a bicycle as described in claim 1, wherein each of said curved flange portions has a back end and a bottom end.

3. A deployable training wheels for a bicycle as described in claim 2, wherein each of said elongate support members includes a second end portion which pivots between and is engagable to said back end and said bottom end of a respective said curved flange portion.

4. A deployable training wheels for a bicycle as described in claim 3, wherein each of said elongate support members has an intermediate portion which is angled relative to said second end portion and also has a first end portion which is angled relative to said intermediate portion and which is generally parallel to said second end portion.

5. A deployable training wheels for a bicycle as described in claim 1, wherein said releasing and locking assembly includes a pair of first locking pins movably and biasedly disposed in said first tubular stems and through said top sides of said curved flange portions and being engagable to said second ends of said elongate support members for locking said elongate support members in ground engagement positions, each of said first locking pins having a ring member attached thereto for allowing a user to manually retract said first locking pin so that a respective said elongate support member can be pivoted to the non-ground engagement position.

6. A deployable training wheels for a bicycle as described in claim 5, wherein said releasing and locking assembly also includes first spring members being securely disposed in said first tubular stems and about said first locking pins for retaining said first locking pins in said first tubular stems and for biasing said first locking pins through said top sides of said curved flange portions of said hubs.

7. A deployable training wheels for a bicycle as described in claim 6, wherein said releasing and locking assembly further includes a pair of second locking pins movably and biasedly disposed in said second tubular stems and through said front sides of said curved flange portions and being engagable to said second ends of said elongate support members for locking said elongate support members in non-ground engagement positions.

8. A deployable training wheels for a bicycle as described in claim 7, wherein said releasing and locking assembly also includes second spring members being securely disposed in said second tubular stems and about said second locking pins for retaining said second locking pins in said second tubular stems and for biasing said second locking pins through said front sides of said curved flange portions of said hubs.

9. A deployable training wheels for a bicycle as described in claim 6, wherein said releasing and locking assembly further includes cables being connected to said second locking pins for retracting said second locking pins from engagement with said elongate support members to allow said wheels to be pivotally deployed in the ground engagement positions.

10. A deployable training wheels for a bicycle as described in claim 9, wherein said releasing and locking assembly also includes a lever being adapted to be mounted to handle bars of the bicycle and being attached to said cables for releasing said second pins from engagement with said elongate support members.

11. A deployable training wheels for a bicycle comprising:
    a pair of hubs being for securely mounting about a rear axle of a bicycle, each of said hubs including a main portion being adapted for securely mounting upon a respective end of the rear axle of the bicycle, and also including a curved flange portion extending outwardly from said main portion and having a top side and a front side, and further including a first tubular stem extending through said top side of said curved flange portion and having a bore extending therethrough, and also including a second tubular stem extending through said front side of said curved flanged portion and having a bore extending therethrough, each of said curved flange portions having a back end and a bottom end;
    a pair of elongate support members each having a first end and a second end for pivotally mounting to a respective end of the rear axle of the bicycle, each of said elongate support members including a second end portion which pivots between and is engagable to said back end and said bottom end of a respective said curved flange portion, each of said elongate support members having an intermediate portion which is angled relative to said second end portion and also having a first end portion which is angled relative to said intermediate portion and which is generally parallel to said second end portion;
    a pair of wheels being mounted to said first ends of said elongate support members;
    a releasing and locking assembly for releasing and locking said elongate support members relative to said hubs including a pair of first locking pins movably and biasedly disposed in said first tubular stems and through said top sides of said curved flange portions and being engagable to said second ends of said elongate support members for locking said elongate support members in ground engagement positions, each of said first locking pins having a ring member attached thereto for allowing a user to manually retract said first locking pin so that a respective said elongate support member can be pivoted out of the ground engagement position, said releasing and locking assembly also including first spring members being securely disposed in said first tubular stems and about said first locking pins for retaining said first locking pins in said first tubular stems and for biasing said first locking pins through said top sides of said curved flange portions of said hubs, said releasing and locking assembly further including a pair of second locking pins movably and biasedly disposed in said second tubular stems and through said front sides of said curved flange portions and being engagable to said second ends of said elongate support members for locking said elongate support members in non-ground engagement positions, said releasing and locking assembly also including second spring members being securely disposed in said second tubular stems and about said second locking pins for retaining said second locking pins in said second tubular stems and for biasing said second locking pins through said front sides of said curved flange portions of said hubs, said releasing and locking assembly further including cables being connected to said second locking pins for retracting said second locking pins from engagement with said elongate support members to allow said wheels to be pivotally deployed in the ground engagement positions, said releasing and locking assembly also including a lever being adapted to be mounted to handle bars of the bicycle and being attached to said cables for releasing said second pins from engagement with said elongate support members.

* * * * *